US007118039B1

United States Patent
Sun et al.

(10) Patent No.: US 7,118,039 B1
(45) Date of Patent: Oct. 10, 2006

(54) BAR CODE ADDRESSING AUDIO PLAYING DEVICE

(76) Inventors: Kuan-Hung Sun, 21F, No. 59, Chung Yi Rd., Kaohsiung (TW); Ting-Wi Hou, 6F, No. 11, Hwa Si St., Fengshan City (TW); Min-Syong Huang, No. 12, Hsin Jen 5 St., Ta Li City, Taichung Hsien (TW)

( * ) Notice: Subject to any disclaimer, the term of this patent is extended or adjusted under 35 U.S.C. 154(b) by 0 days.

(21) Appl. No.: 11/103,545

(22) Filed: Apr. 12, 2005

(51) Int. Cl.
*G06K 7/10* (2006.01)
(52) U.S. Cl. ............... 235/462.01; 235/462.13
(58) Field of Classification Search ........... 235/462.01, 235/462.13
See application file for complete search history.

(56) References Cited

U.S. PATENT DOCUMENTS 4,375,058 A * 2/1983 Bouma et al. .............. 382/181
4,983,996 A * 1/1991 Kinoshita ................... 396/312
6,561,429 B1 * 5/2003 Bryant et al. ........... 235/462.43
6,669,092 B1 * 12/2003 Leanheart et al. ...... 235/462.13
2004/0064709 A1 * 4/2004 Heath ........................ 713/186

* cited by examiner

*Primary Examiner*—Thien M. Le
*Assistant Examiner*—Lisa M. Caputo
(74) *Attorney, Agent, or Firm*—Bacon & Thomas (57) ABSTRACT

A bar code addressing audio playing device mainly has a microprocessor, a bar code scanner and an audio playing unit. The memory store information is generated by a bar code addressing method and the information has many bar code data of bar codes and multiple sections of each serial audio signal. The bar code scanner is connected to the microprocessor to provide bar code data of the bar code to the microprocessor. The audio playing unit is connected to the microprocessor. The microprocessor controls the audio playing unit to play a specific section according to the bar code data from the bar code scanner. Therefore, the user can easily and quickly repeat one section of a serial audio signal.

6 Claims, 11 Drawing Sheets

BAR CODE ADDRESSING AUDIO PLAYING DEVICE

BACKGROUND OF THE INVENTION

1. Field of the Invention

The present invention relates to an audio playing device and more particularly to a bar code addressing audio playing device that plays any one audio section of a serial audio signal stored in a storage device according to corresponding bar code.

2. Description of Related Art

At present, there are many types of audio storage devices for storing audio signals, and the audio signals are converted to specific formats suitable to store in the corresponding audio storage device. For example, the CD, VCD, DCD, or digital memory devices are suitable to store the digitized audio signals. The tape for tape recorders is also practical to tape magnetized audio signals.

The CD, VCD, DCD and the digital memory devices are popular products for storing audio signals presently, since long life of storage is their common feature. Regarding music CDs, there are many complete songs stored in the music CD. A person may use the CD player to play specific song, and freely select a specific song to play since the CD player has the selection function. However, the person can not freely select a section of the song to repeatedly play by the CD player. Digital media players such as an MP3 player have the same problem.

Therefore, the present invention provides a bar code addressing audio playing device to overcome the use problem of the conventional audio players.

SUMMARY OF THE INVENTION

The main objective of the present invention is to provide a bar code audio playing device that has a bar code addressing function to play a section of a serial audio signal. Therefore, the operator can freely repeat a specific section of the serial audio signal, for example one song.

A bar code addressing audio playing device mainly has a microprocessor, a bar code scanner and an audio playing unit. The memory store information generated by a bar code addressing method and the information has many bar code data of bar codes and multiple sections of each serial audio signal. The bar code scanner is connected to the microprocessor to provide bar code data of the bar code to the microprocessor. The audio playing unit is connected to the microprocessor. The microprocessor controls the audio playing unit to play a specific section according to the bar code data from the bar code scanner. Therefore, the operator can easily and quickly repeat one section of a serial audio signal.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
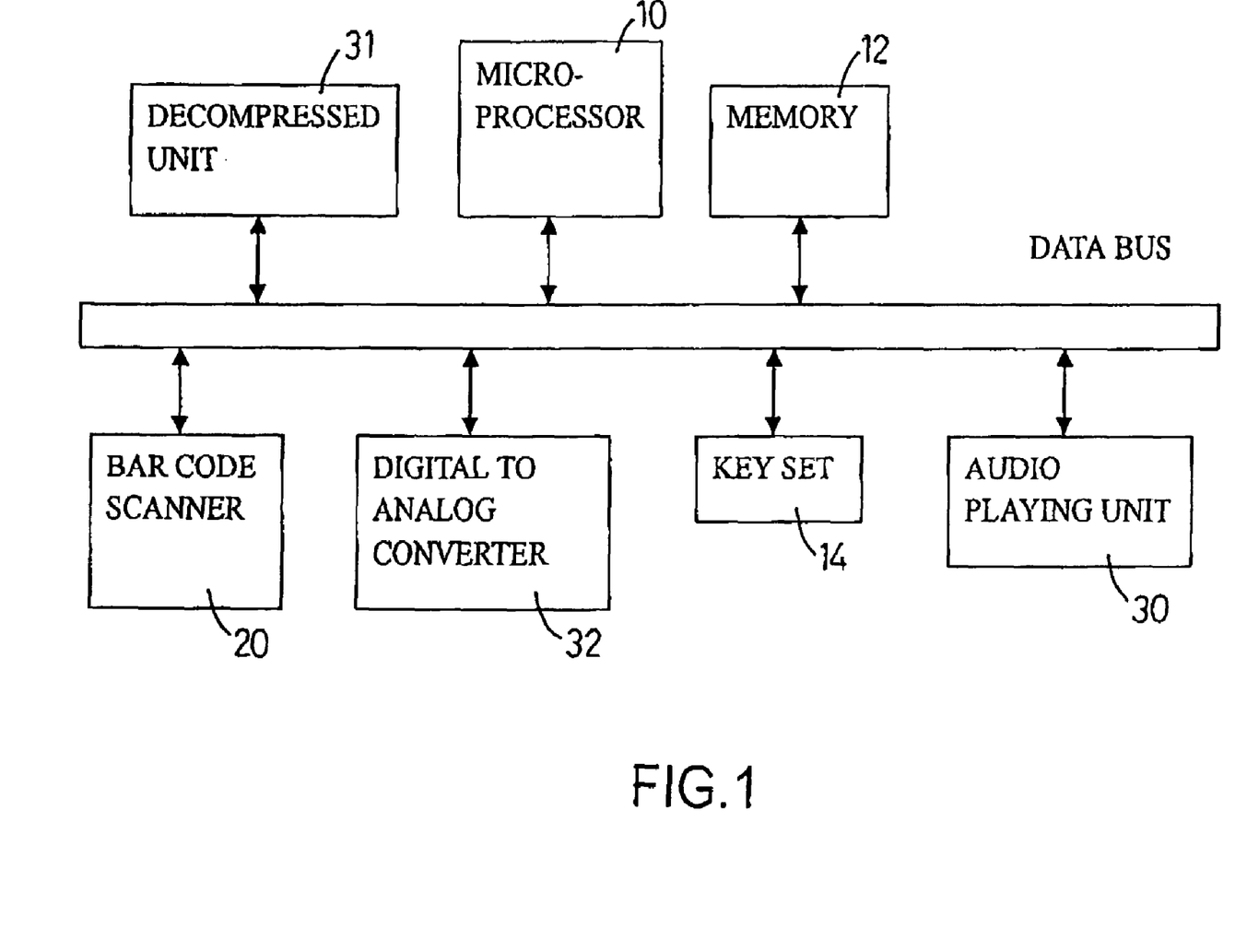
FIG. 1 is a functional block diagram of a first embodiment of an audio playing device in accordance with the present invention.

With reference to FIG. 1, a preferred embodiment of an audio playing device has a microprocessor (10), a memory (12), a bar code scanner (20), an audio playing unit (30), a digital to analog converter (32), a data decompressed unit (31), and a key set (14). The elements are connected to a common data bus to communicate with each other.

The memory (12) is connected to the microprocessor (10) and is used to store information generated by a bar code addressing method. The information has many bar code data of bar codes (50) and multiple sections of each serial audio signal. The bar code scanner (20) is connected to the microprocessor (10) to provide bar code data of the bar codes (50) to the microprocessor (10). The audio playing unit (30) is connected to the data decompressed unit (31), the digital to analog converter (32) and the microprocessor (10). The microprocessor (10) controls operation of the audio playing unit (30) and outputs a section of the serial audio signal to the audio playing unit (30) to play.

Figure 2:
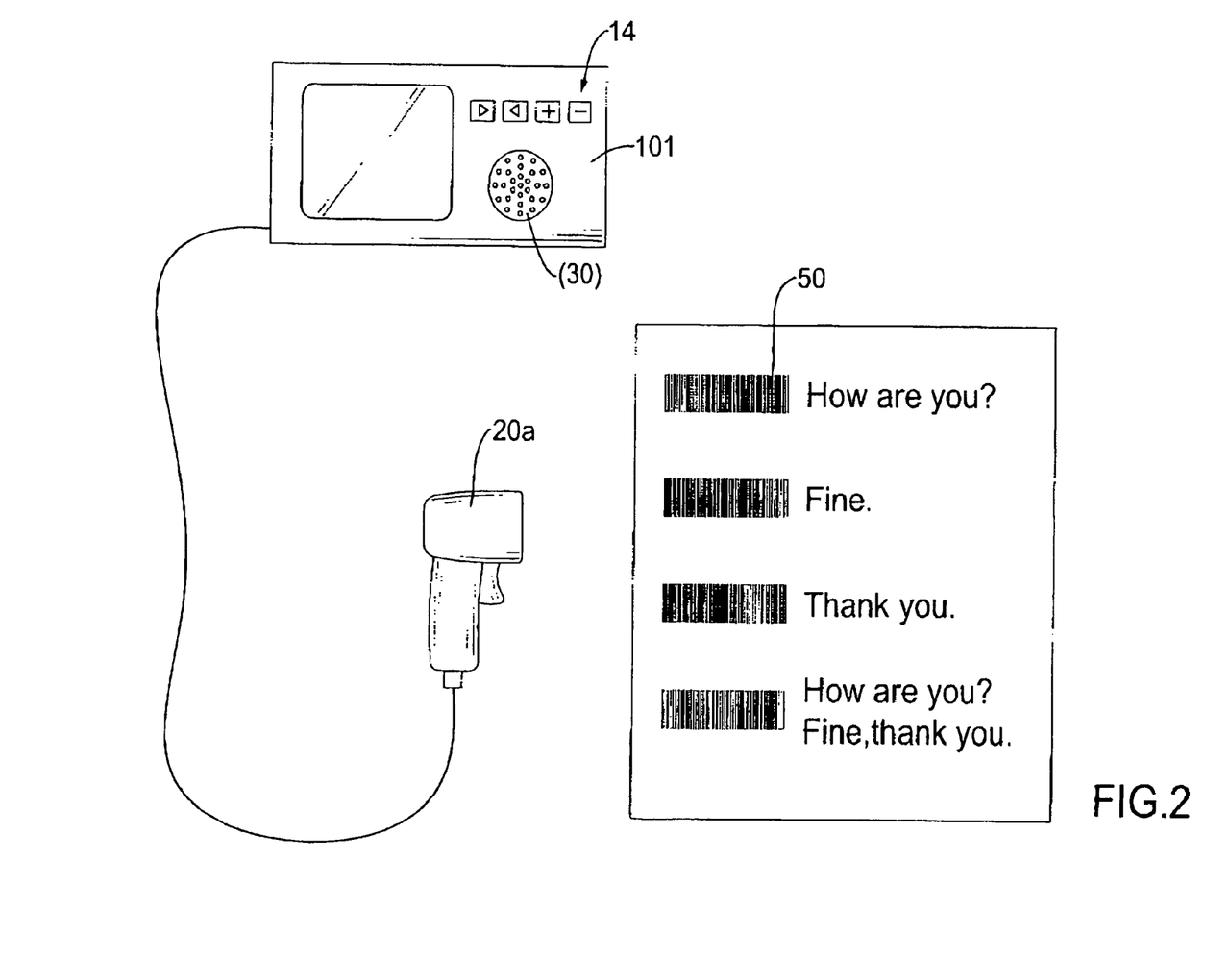
FIG. 2 is a schematic view of the audio playing device having a bar code scanner and a paper on which bar codes are printed.
Figure 3:
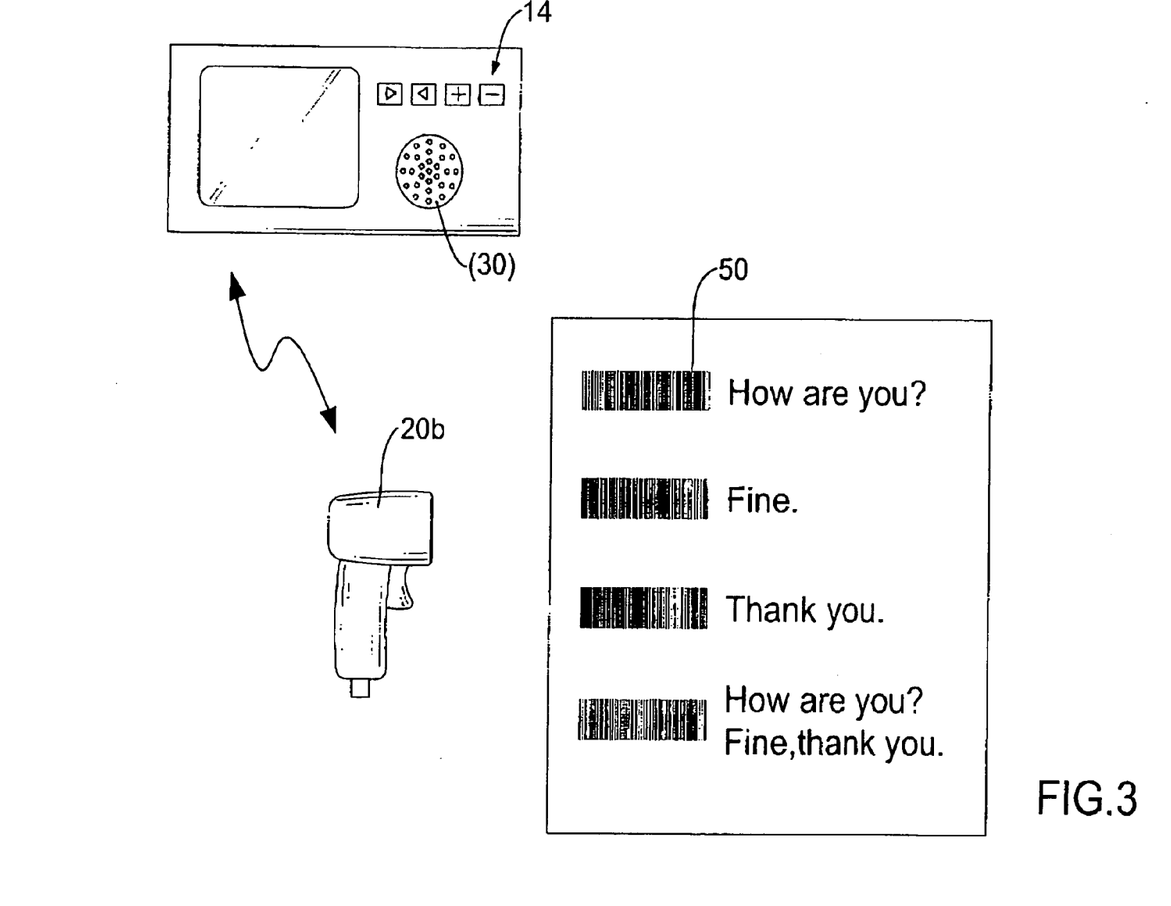
FIG. 3 is a schematic view of the audio playing device having a wireless bar code scanner and a paper on which bar codes are printed.
Figure 4:
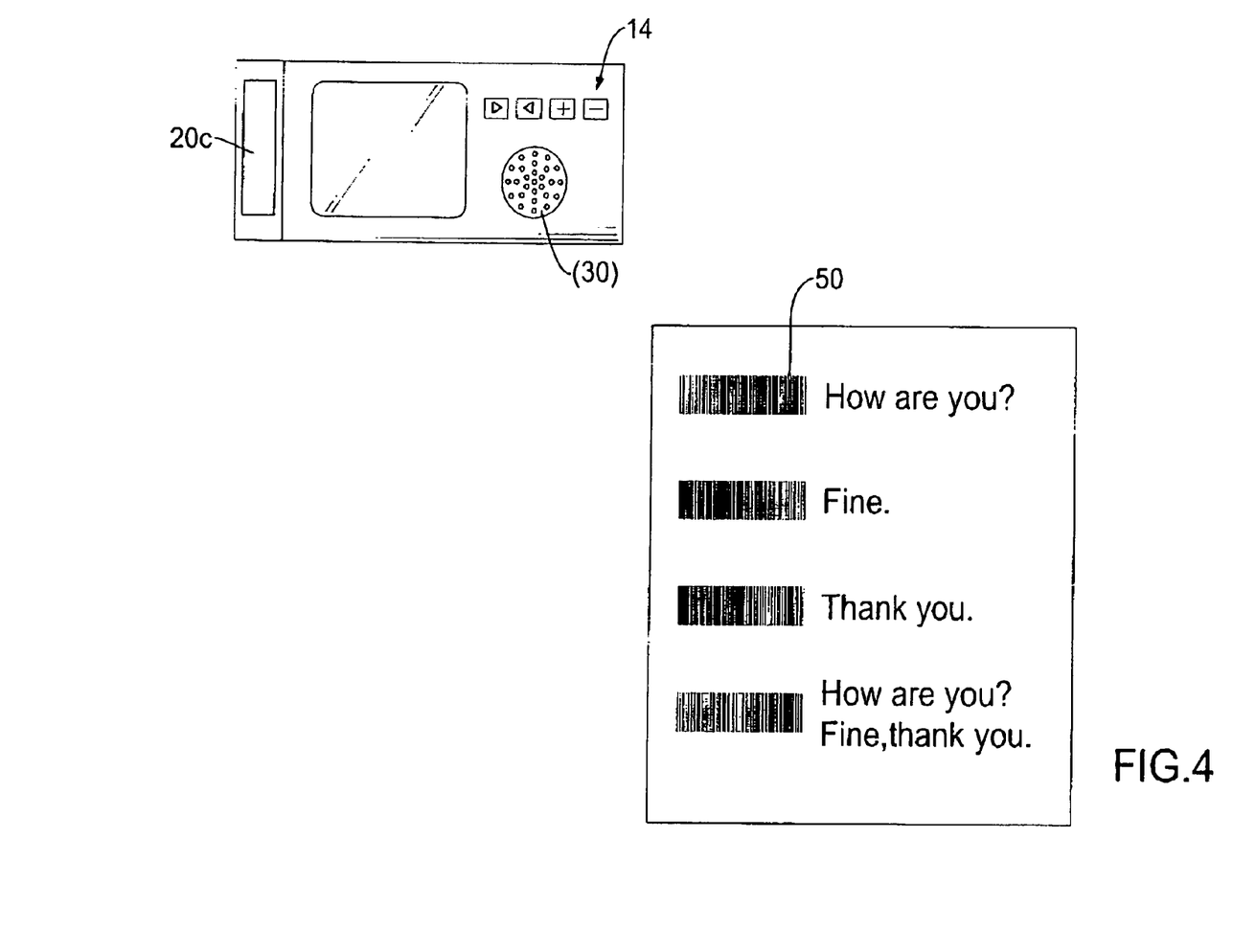
FIG. 4 is a schematic view of a third embodiment of the audio playing device having a bar code scanner integrated in the audio playing device and a paper on which bar codes are printed.

With reference to FIG. 2, one implementation of the present invention includes a main body (101) and the external bar code scanner (20a). The key set (14) is attached on the main body (101) and other elements are retained therein. With further reference to FIG. 3, another implementation of the present invention shows that the bar code scanner (20b) is a wireless bar code scanner. With reference to FIG. 4, the bar code scanner (20c) is retained in the main body (101) to be integrated with the main body (101).

Figure 5:
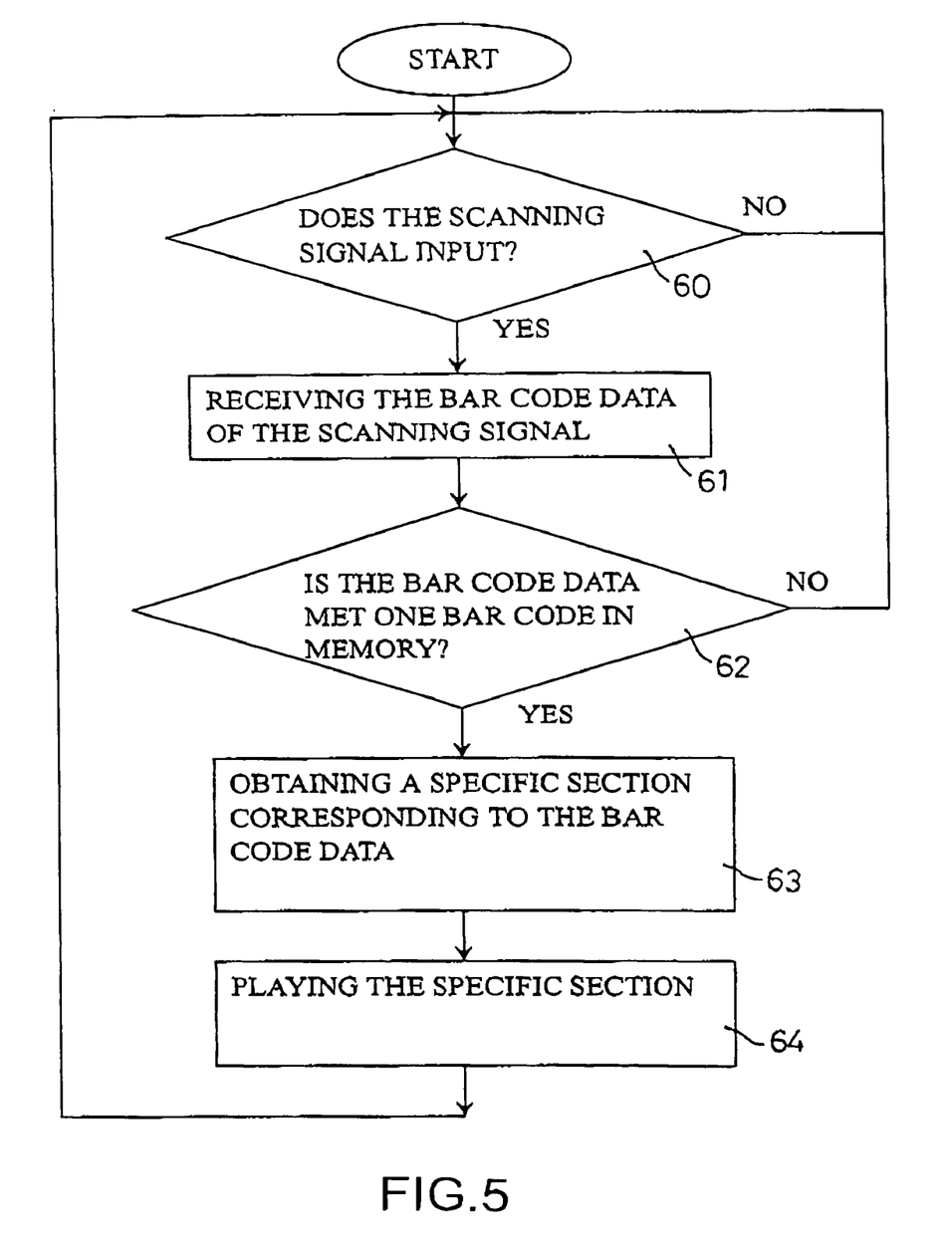
FIG. 5 is a flow chart of operation of the first embodiment of the audio playing device in accordance with the present invention.

With reference to FIGS. 1 and 2, since each bar code corresponds to one specific section of a serial audio signal, the microprocessor (10) will obtain the bar code data of the present bar code (50) if the bar code scanner (20a) is shining on the present bar code (50). The microprocessor (10) can search and then output the specific section to the audio playing unit (30) to play the specific section of the serial audio signal. Therefore, with further reference to FIG. 5, the operation flow chart of the present invention has steps of:

(a) detecting whether the bar code scanner has output any scanning signal (60), if not, repeating this step until the scanning signal is input; if yes, the next step will be executed;

(b) receiving the bar code data of the scanning signal (61);

(c) comparing whether the bar code data conforms to one bar code data in the memory (62), if not, return to step (a), if yes, the next step will be executed;

(d) obtaining a specific section corresponding to the bar code data (63); and (e) playing the specific section (64).

With reference to FIG. 2, multiple bar codes (50) and contents of multiple texts corresponding to sections are printed on a paper or a book, wherein each bar code (50) corresponds to one specific section. When the bar code scanner (20a) shines on one bar code (50) on the paper, the main body (101) will play the corresponding specific section by the audio playing unit (30). Therefore, the main body (101) can repeat playing the specific section easily and quickly.

Further, the key set (14) has multiple function keys (volume adjusting, stop playing etc functions) attached on the main body (101). The user can press these function keys to control playing operation of the audio playing unit (30). To control operation of the audio playing unit (30) easily, a comparing controlling function procedure is built in the microprocessor (10) and multiple bar code data of function bar codes are made to store in the memory (12). The function bar codes are corresponding to the function keys of the main body (101). The function bar codes can be printed on a paper or the like. When the operator using the bar code scanner (20a) aims at the function bar code on the paper, the microprocessor (10) executes the comparing controlling function procedure to determine which function is selected by the operator, and then controls the audio playing unit (30) according to the function bar code. Therefore, the operator does not press any function key to control operation of audio playing unit (30).

Figure 6:
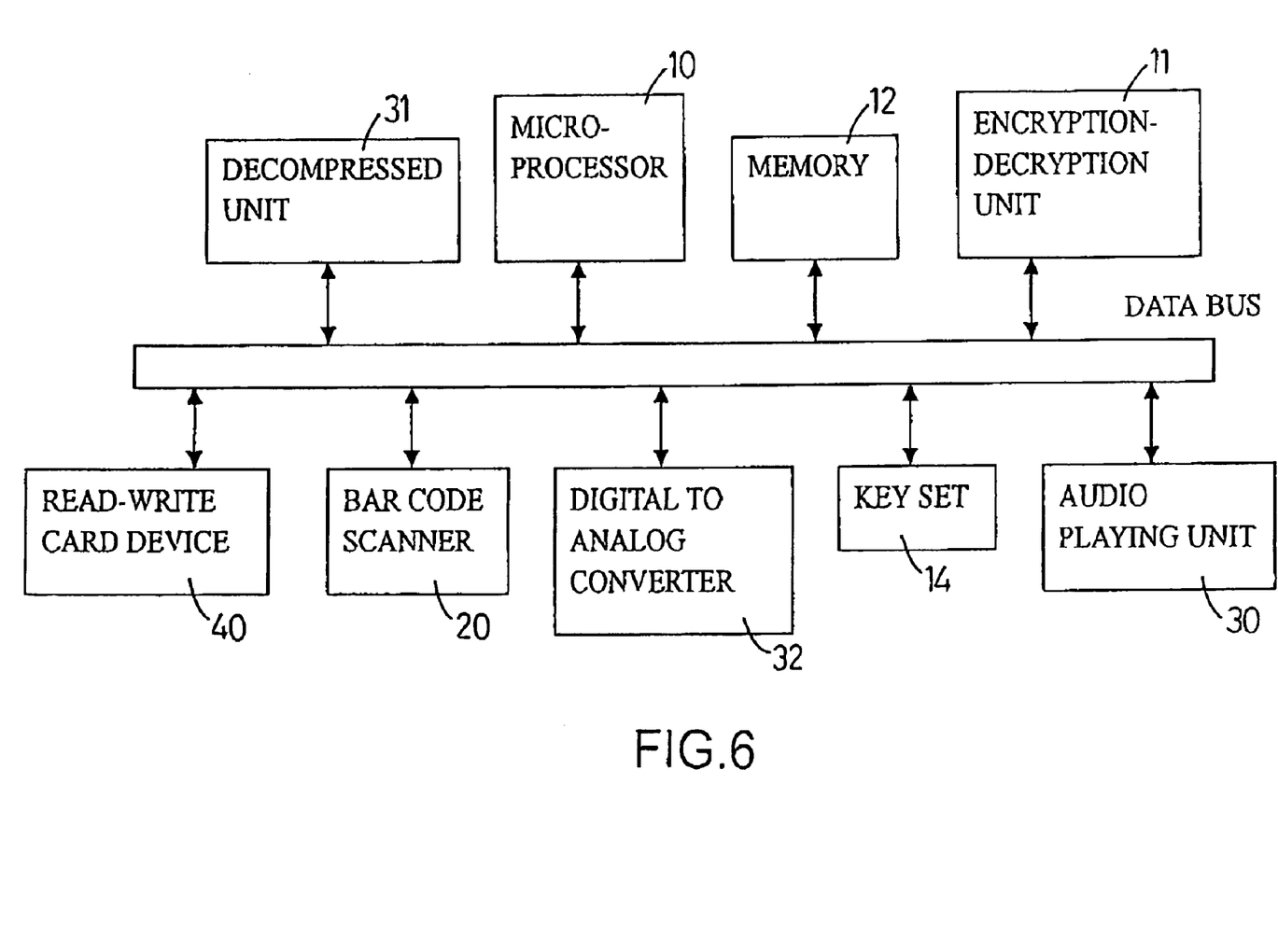
FIG. 6 is a functional block diagram of a first embodiment of an audio playing device in accordance with the present invention.

With reference to FIG. 6, another preferred embodiment of the audio playing device (30) in accordance with the present invention further has an encryption-decryption unit (11) and a read-write card unit (40). These elements are also connected to the data bus to connect to other elements shown in the FIG. 1.

Figure 7:
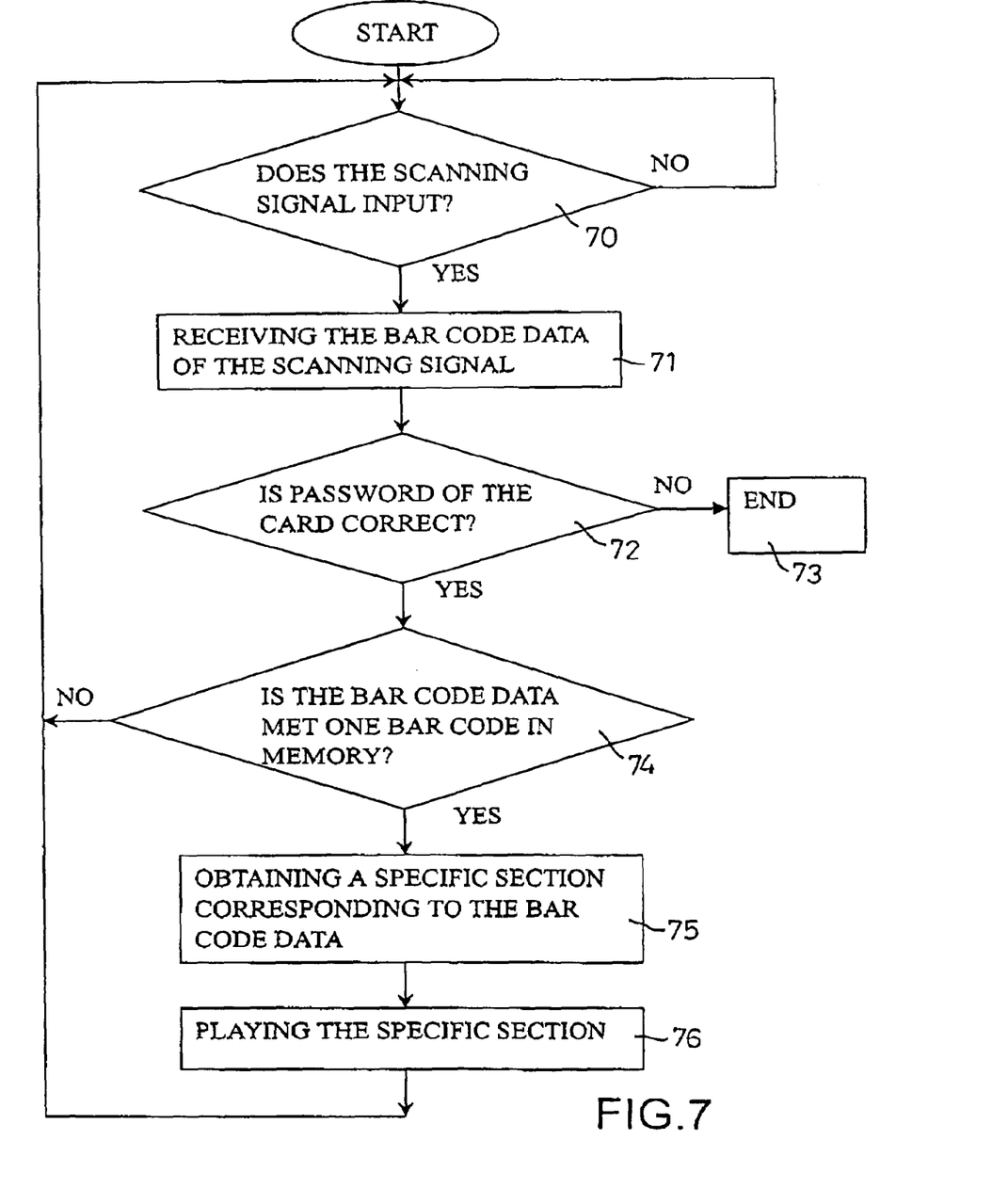
FIG. 7 is a flow chart of operation of the first embodiment of the audio playing device in accordance with the present invention.
Figure 8:
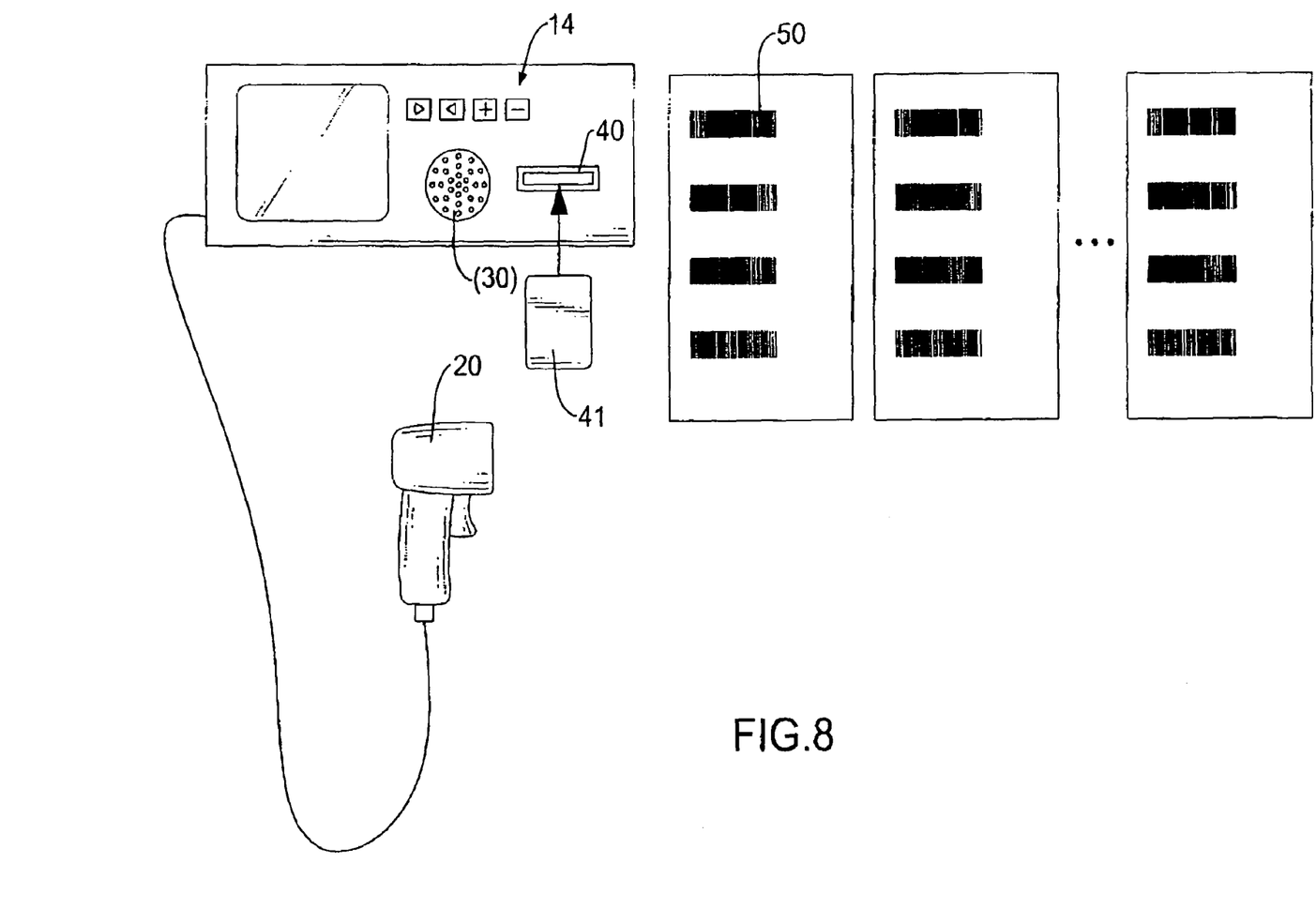
FIG. 8 is a schematic view of the audio playing device playing different type of bar codes.

This preferred embodiment mainly adds a verification function. The microprocessor (10) further has a verification procedure, and a memory (12) further stores multiple passwords. With further reference to FIG. 8, since the main body (101) has the read-write card device (40), the operator has to insert a card (41) into the read-write card device (40) be able to use the audio playing device. With reference to FIG. 7, the operation of the flow chart of the preferred embodiment has steps of:

(a) detecting whether the bar code scanner has output any scanning signal, if not, repeating this step until the scanning signal is input; if yes, the next step will be executed (70);

(b) receiving the bar code data of the scanning signal (71);

(c) determining whether the password of the card is correct (72), wherein if the password of the card conforms to one in the memory, the password is confirmed correct and the next step will be executed, but if the password is incorrect the flow chart is ended (73);

(d) comparing whether the bar code data conforms to one bar code data in the memory (74), if not, return to the step (a); if yes, the next step will be executed;

(e) obtaining a specific section corresponding to the bar code data (75); and (f) playing the specific section (76).

Based on the second embodiment of the present invention, the audio playing device can store the sections of many serial audio signals published from different companies and verified codes (passwords) for different companies. The operator has to obtain a card having a verified code of one company to have allowance of use of the audio playing device.

Figure 9:
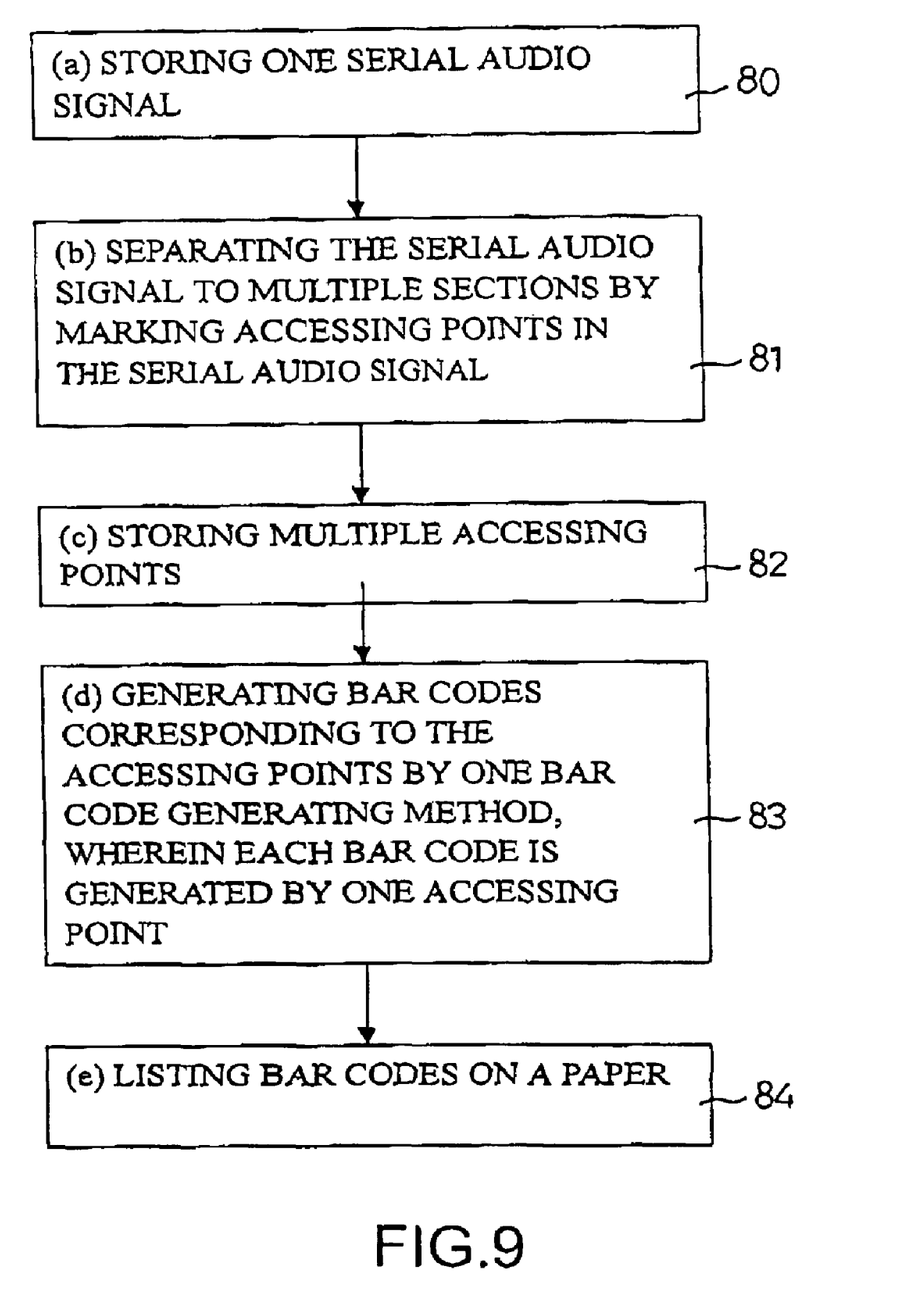
FIG. 9 is a flow chart of a bar code addressing method in accordance with the present invention.
Figure 10:
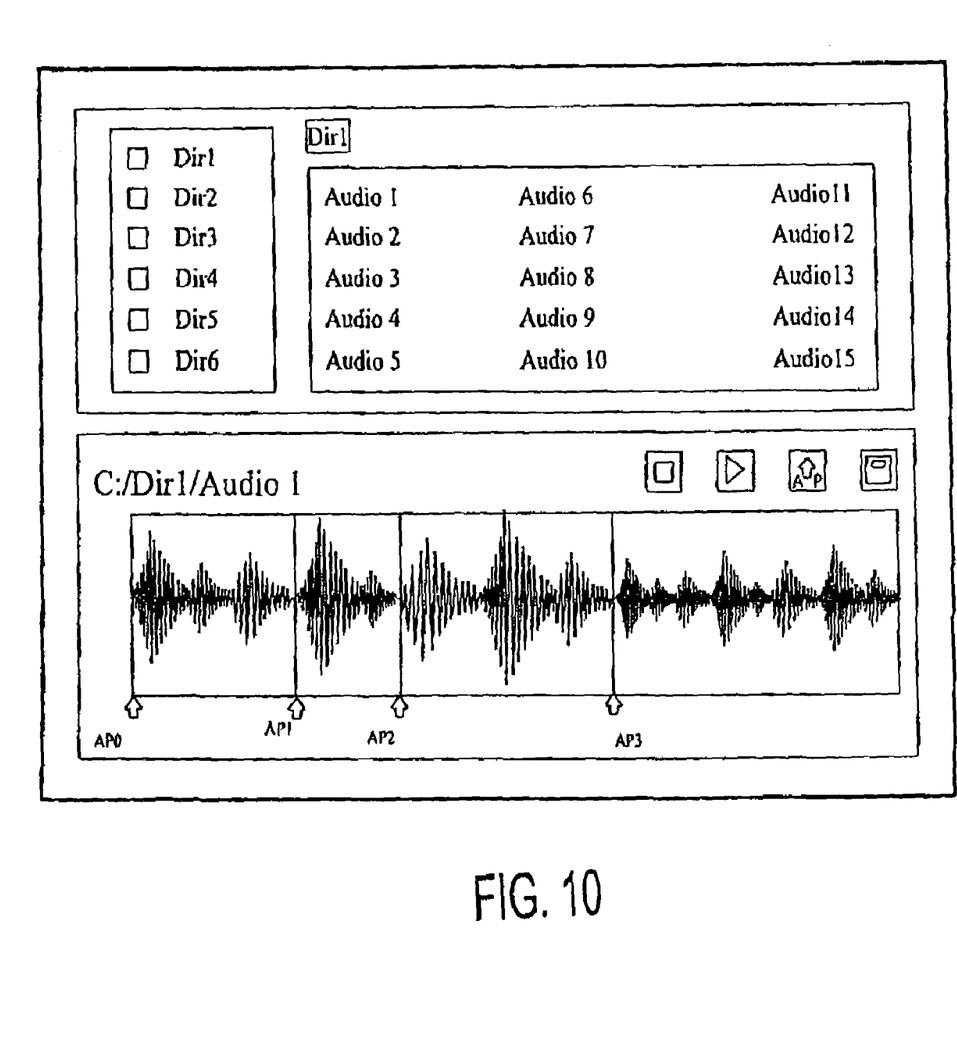
FIG. 10 is a schematic view of the generating multiple sections of a serial audio signal when the bar code addressing method is executed.
Figure 11:
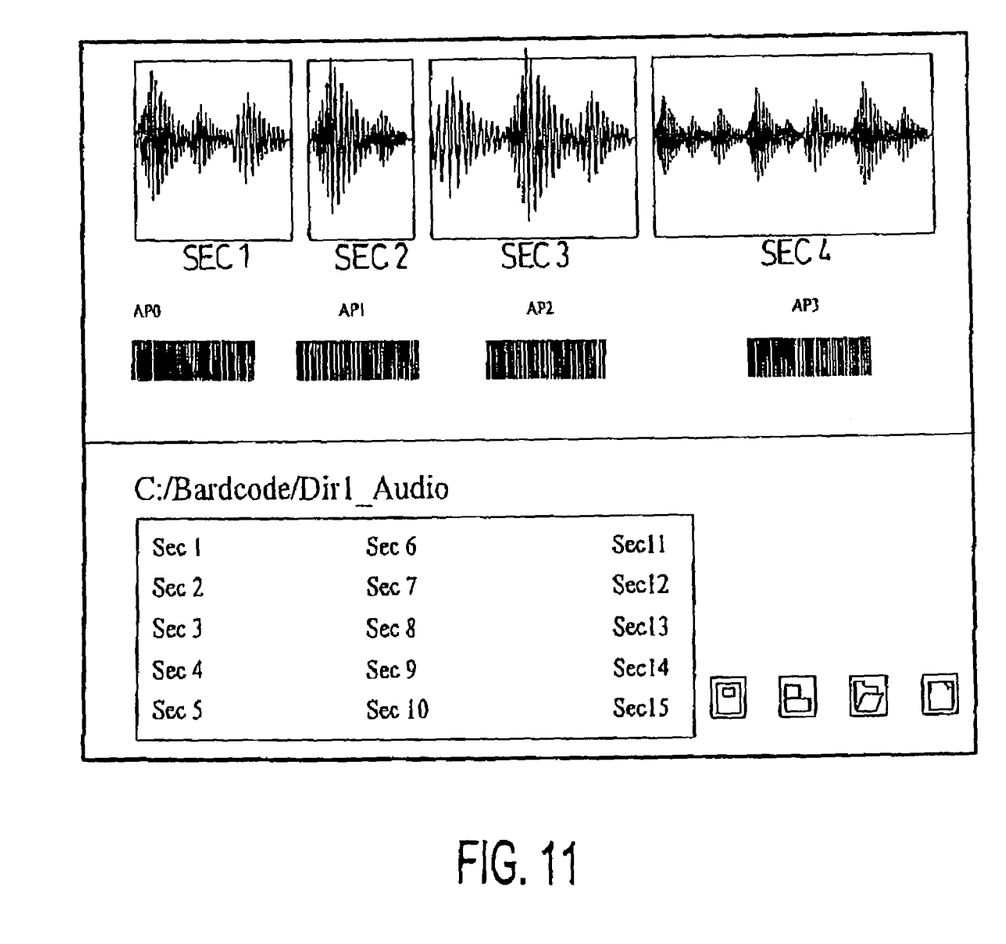
FIG. 11 is a schematic view of the generating multiple bar codes of the serial audio signal when the bar code addressing method is executed.

With reference to FIGS. 9, 10 and 11, the bar code addressing method has steps of:

(a) storing one serial audio signal (80), shown in the wave signal in FIG. 10;

(b) separating the serial audio signal to multiple sections by marking accessing points (AP0~AP3) in the serial audio signal (81);

(c) storing multiple accessing points (82);

(d) generating bar codes corresponding to the accessing points by one bar code generating method (83), wherein each bar code is generated by one accessing point, shown in FIG. 11; and (e) listing bar codes on a paper (84), shown in FIG. 2.

The bar code generating method has three different types:

1. Direct-transforming method. The bar code data is the access point.

2. Varied-transforming method. The bar code data is the access point and security data.

3. Encryption-transforming method. The bar code data is the encrypted access point.

To suit reading of those types of bar codes, in FIG. 6 the audio playing device has the encryption-decryption unit. Since the card stores the type of the bar code, the microprocessor can determine whether the bar code data from the bar code scanner are provided to the encryption-decryption unit. The encryption-decryption unit will read the real access point in the bar code data and then provides the access point to the microprocessor.

At present, some books have a CD or VCD to help readers to understand the content of the book. Therefore, the bar code can be further printed on the book, so when the reader reads one paragraph of content matched to one section of one serial audio signal, the reader can use the bar code scanner to shine on the bar code to play the section. Thus the operator can repeat the section quickly and easily by means of the audio playing device.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A bar code addressing audio playing device, comprising:

a microprocessor connected to a memory used to store information generated by a bar code addressing method, wherein the information has sections of each serial audio signal, bar code data and a bar code comparison procedure, and the microprocessor is programmed to perform steps of the bar code addressing method comprising:

storing one serial audio signal;

separating the serial audio signal to multiple sections by making accessing points in the serial audio signal;

storing said accessing points;

generating bar codes corresponding to the accessing points by one bar code generating method, wherein each bar code is generated by one accessing point; and listing said bar codes on a paper;

a bar code scanner connected to the microprocessor to provide bar code data to the microprocessor; and an audio playing unit connected to the microprocessor through a digital to analog converter and a data decompressed unit.

2. The bar code addressing audio playing device as claimed in claim 1, wherein the microprocessor is connected to a key set.

3. The bar code addressing audio playing device as claimed in claim 2 wherein the memory stores passwords and the microprocessor has a verification procedure.

4. The bar code addressing audio playing device as claimed in claim 3, wherein the microprocessor is connected to a read-write card device storing a password.

5. The bar code addressing audio playing device as claimed in claim 4, wherein the microprocessor is connected to an encryption-decryption unit adapted to decrypt an encrypted bar code data.

6. The bar code addressing audio playing device as claimed in claim 5, wherein the memory stores multiple function bar code data and the microprocessor has a comparing controlling function procedure.

* * * * *